United States Patent
Seo et al.

(10) Patent No.: US 11,522,484 B2
(45) Date of Patent: Dec. 6, 2022

(54) MOTOR CONTROLLER (71) Applicant: DENSO CORPORATION, Kariya (JP)

(72) Inventors: Yuuichi Seo, Kariya (JP); Hironori Iwamiya, Kariya (JP); Hirokazu Toyoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 137 days.

(21) Appl. No.: 17/165,402

(22) Filed: Feb. 2, 2021

(65) Prior Publication Data

US 2021/0242816 A1 Aug. 5, 2021

(30) Foreign Application Priority Data

Feb. 4, 2020 (JP) .............................. JP2020-017392

(51) Int. Cl.
*H02P 25/22* (2006.01)
*H02P 6/16* (2016.01)
*H02K 11/33* (2016.01)

(52) U.S. Cl.
CPC .............. *H02P 25/22* (2013.01); *H02K 11/33* (2016.01); *H02P 6/16* (2013.01)

(58) Field of Classification Search
CPC ............ H02P 25/22; H02P 6/16; H02K 11/33
See application file for complete search history.

(56) References Cited

U.S. PATENT DOCUMENTS

| 8,279,639 B2* | 10/2012 | Sakakibara | ............. H02P 27/06 318/722 |
| 2013/0127383 A1* | 5/2013 | Kawamura | ............. H02P 21/36 318/400.09 |
| 2013/0305760 A1* | 11/2013 | Shinomoto | ............. H02P 29/62 318/473 |

FOREIGN PATENT DOCUMENTS

JP 2018-74710 A 5/2018

* cited by examiner

*Primary Examiner* — Zoheb S Imtiaz
(74) *Attorney, Agent, or Firm* — Posz Law Group, PLC (57) ABSTRACT

A motor controller for controlling a drive of a motor having plural phase windings includes upper and lower arm circuits and a control unit. The control unit switchingly controls ON/OFF of switches of the upper and lower arm circuits, for sequentially switching an energized phase of the motor. Then, from among the plural switches, a switch forming an energization path to the energized phase is designated as an energized phase switch with the others of the plural switches being designated as non-energized phase switches. Further, from among the non-energized phase switches, a switch forming a path of a reflux current that accompanies the switching of the energized phase is designated as a reflux switch. Then, the control unit performs an ON control of the energized phase switch in addition to performing an ON control of the reflux switch.

13 Claims, 6 Drawing Sheets

| DETERMINATION CONDITION | | TURNED-ON REFLUX PATH |
|---|---|---|
| POWER SUPPLY PATTERN | ROTATION DIRECTION | |
| UH-VL | CW | VH |
| | CCW | UL |
| UH-WL | CW | UL |
| | CCW | WH |
| VH-WL | CW | WH |
| | CCW | VL |
| VH-UL | CW | VL |
| | CCW | UH |
| WH-UL | CW | UH |
| | CCW | WL |
| WH-VL | CW | WL |
| | CCW | VH |

MOTOR CONTROLLER

CROSS REFERENCE TO RELATED APPLICATION

The present application is based on and claims the benefit of priority of Japanese Patent Application No. 2020-017392, filed on Feb. 4, 2020, the disclosure of which is incorporated herein by reference.

TECHNICAL FIELD

The present disclosure generally relates to a motor controller that controls the drive of a motor with multiple phase windings.

BACKGROUND INFORMATION

A motor controller rotationally drives a motor having a plurality of phase windings. The motor controller includes upper and lower arm circuits formed by switches, and controls the ON/OFF states of the switches to sequentially switch the energized phases or power supply phases.

SUMMARY

In one embodiment, a reflux switch is turned ON in addition to the energized phase switch. Therefore, since the reflux current flows through the reflux switch in the ON state, the reflux current flows with a smaller electric resistance than an electric resistance of a body diode. Therefore, the heat generated by the switches is reduced, and energy is saved.

It should be noted that the reference numbers in the above parentheses merely show an example of a correspondence relationship with a specific configuration in the embodiment described later, and do not limit the technical scope at all.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, embodiments of the present disclosure are described with reference to the drawings. Incidentally, the same reference numerals are assigned to corresponding components in each embodiment, and therefore duplicate descriptions may be omitted. When only a part of the configuration is described in each embodiment, the configuration of the other embodiments described above can be applied to other parts of such configuration.

First Embodiment

Figure 1:
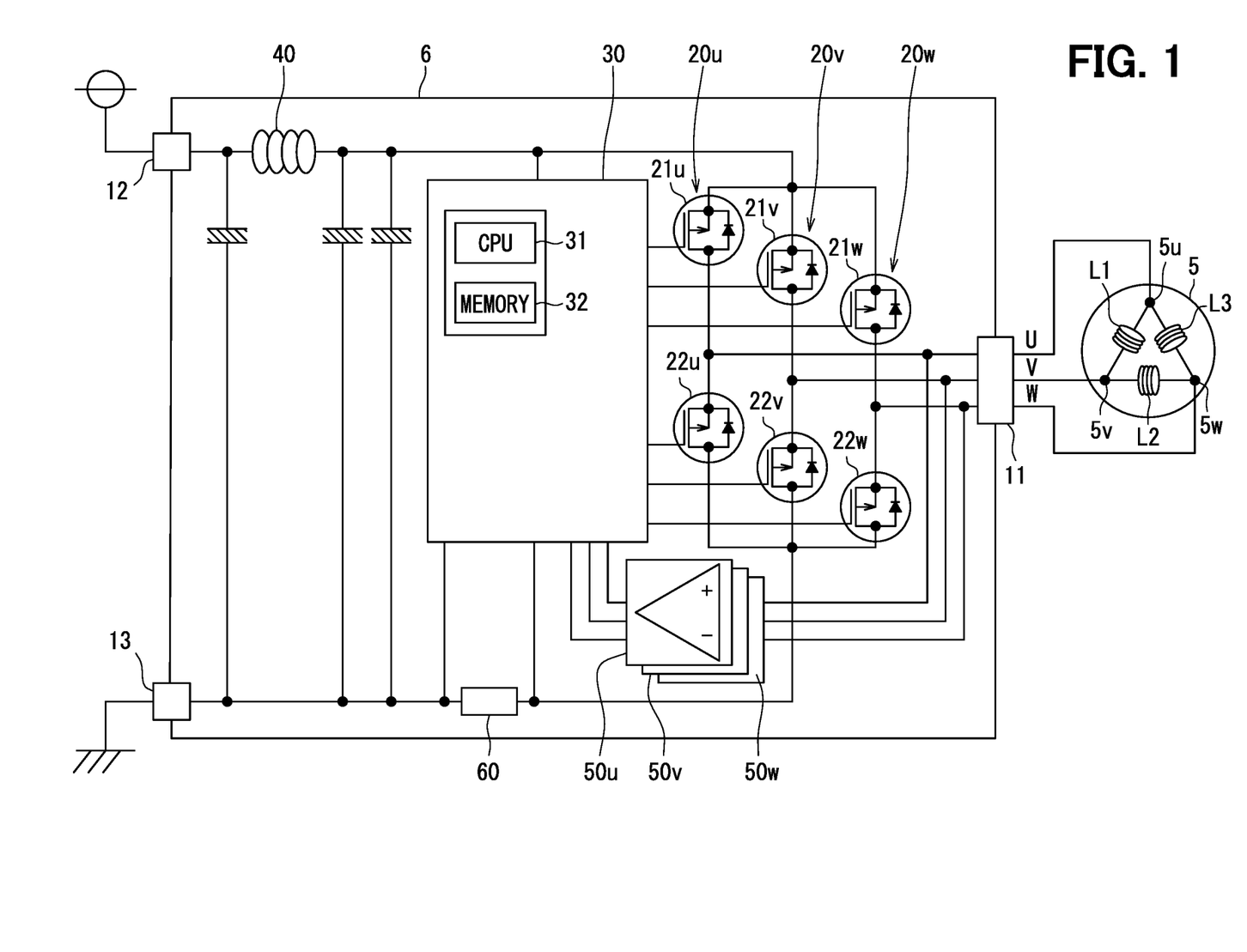
FIG. 1 is a circuit diagram schematically showing a motor controller and a motor to be controlled according to a first embodiment.

A motor 5 and a motor controller 6 shown in FIG. 1 are mounted on a vehicle. For example, in a vehicle using an internal-combustion engine as a travel/physical power source, the motor 5 is implemented as an electric motor of a feed pump that supplies fuel to a high-pressure pump for causing combustion. The motor controller 6 controls the operation of the motor 5 to control the amount of fuel discharged from the feed pump.

The motor 5 has a stator including a plurality of (i.e., three) phase windings L1, L2, and L3, and a rotor (not shown) having a plurality of magnetic pole pairs. In the present embodiment, a three-phase motor consisting of a U-phase, a V-phase, and a W-phase is used as the motor 5. The motor 5 is a brushless motor that does not have a brush and is a sensorless motor that does not have an element for detecting a rotation position of the rotor.

The three windings L1, L2, and L3 are connected to each other by a delta connection. The winding L1 is an inter-UV winding connected to a U-phase terminal $5u$ and to a V-phase terminal $5v$. The winding L2 is an inter-VW winding connected to the V-phase terminal $5v$ and to a W-phase terminal $5w$. The winding L3 is an inter-WU winding connected to the W-phase terminal $5w$ and to the U-phase terminal $5u$. In the following description, when the U-phase terminal $5u$, the V-phase terminal $5v$, and the W-phase terminal $5w$ are not particularly distinguished from each other, they may collectively described as a "power terminal."

The rotor of the motor 5 is rotationally driven by receiving supply of electric power to each of the windings L1, L2, and L3 while sequentially switching the energized phase or power supply phase. In the present specification, "switching the energized phase" means that the phase of the electric current flowing through the windings L1, L2, and L3 is switched by switching the energizing state of the U-phase terminal $5u$, the V-phase terminal $5v$, and the W-phase terminal $5w$. When the energized phase is switched, each of the U-phase terminal $5u$, the V-phase terminal $5v$, and the W-phase terminal $5w$ is switched to one of a voltage E fixed state, a high impedance state, and a zero voltage constrained state respectively described later.

The motor controller 6 includes a motor terminal 11, a battery terminal 12, and a ground terminal 13. The motor terminal 11 is electrically connected to each of the three windings L1, L2, and L3. The battery terminal 12 is electrically connected to a high potential side terminal of the battery mounted on the vehicle. The ground terminal 13 is electrically connected to the ground.

Further, the motor controller 6 includes upper and lower arm circuits $20u$, $20v$, $20w$, a control unit 30, a booster coil 40, a comparator circuit $50u$, $50v$, $50w$, and a current sensor 60.

The booster coil 40 boosts a battery voltage supplied from the battery terminal 12 to a predetermined DC voltage (i.e., a power supply voltage E) and applies the voltage E to an inverter circuit formed by a three-phase bridge circuit. The inverter circuit supplies electric power to the motor 5 while switching the energized phase by sequentially switching the power terminal to which the power supply voltage E is applied. In such manner, the motor controller 6 drives the motor 5 with a trapezoidal wave (i.e., performs a trapezoidal wave drive of the motor 5). For example, in FIG. 2 a U-phase voltage Vu is substantially trapezoidal in the first three zones (Tu4, Tu1, and Tu2) starting from the left side of the figure.

The inverter circuit has three upper and lower arm circuits 20u, 20v, and 20w. The upper and lower arm circuits 20u, 20v, 20w have switches 21u, 21v, 21w forming an upper arm and switches 22u, 22v, 22w forming a lower arm. Each of the upper arm and lower arms is composed of a switching element. A field effect transistor (MOS-FET) is used for these switching elements. In the following description, the switching element may simply be referred to as a "switch."

The upper arm and the lower arms are connected in series (e.g., upper switch 21u and lower switch 22u), and one end of the upper arm is electrically connected in series with the booster coil 40, and one end of the lower arm is electrically connected to the ground terminal 13. The connection point (i.e., a midpoint) between the other end of the upper arm and the other end of the lower arm is electrically connected to the windings L1, L2, and L3 via the motor terminal 11. More specifically, a midpoint of the switches 21u and 22u of the upper and lower arm circuits 20u are electrically connected to the U-phase terminal 5u. A midpoint of the switches 21v and 22v of the upper and lower arm circuits 20v are electrically connected to the V-phase terminal 5v. A midpoint of the switches 21w and 22w of the upper and lower arm circuits 20w are electrically connected to the W phase terminal 5w.

Body diodes parasitizing the switches 21u to 21w forming the upper arms are provided in a direction of blocking the flow of electric current from the battery terminal 12 to the motor terminal 11. Body diodes parasitic on the switches 22u to 22w forming the lower arms are provided in a direction of blocking the flow of electric current from the motor terminal 11 to the battery terminal 12.

The operation of these six switches 21u to 22w is independently controlled by the control unit 30. In such manner, the power terminal of the motor 5 is sequentially switched to one of: (i) the voltage E fixed state, (ii) the high impedance state, and (iii) the zero voltage constrained state. Since these three states are the same for each of the three phases, the U-phase terminal 5u is described below as a representative example.

Figure 2:
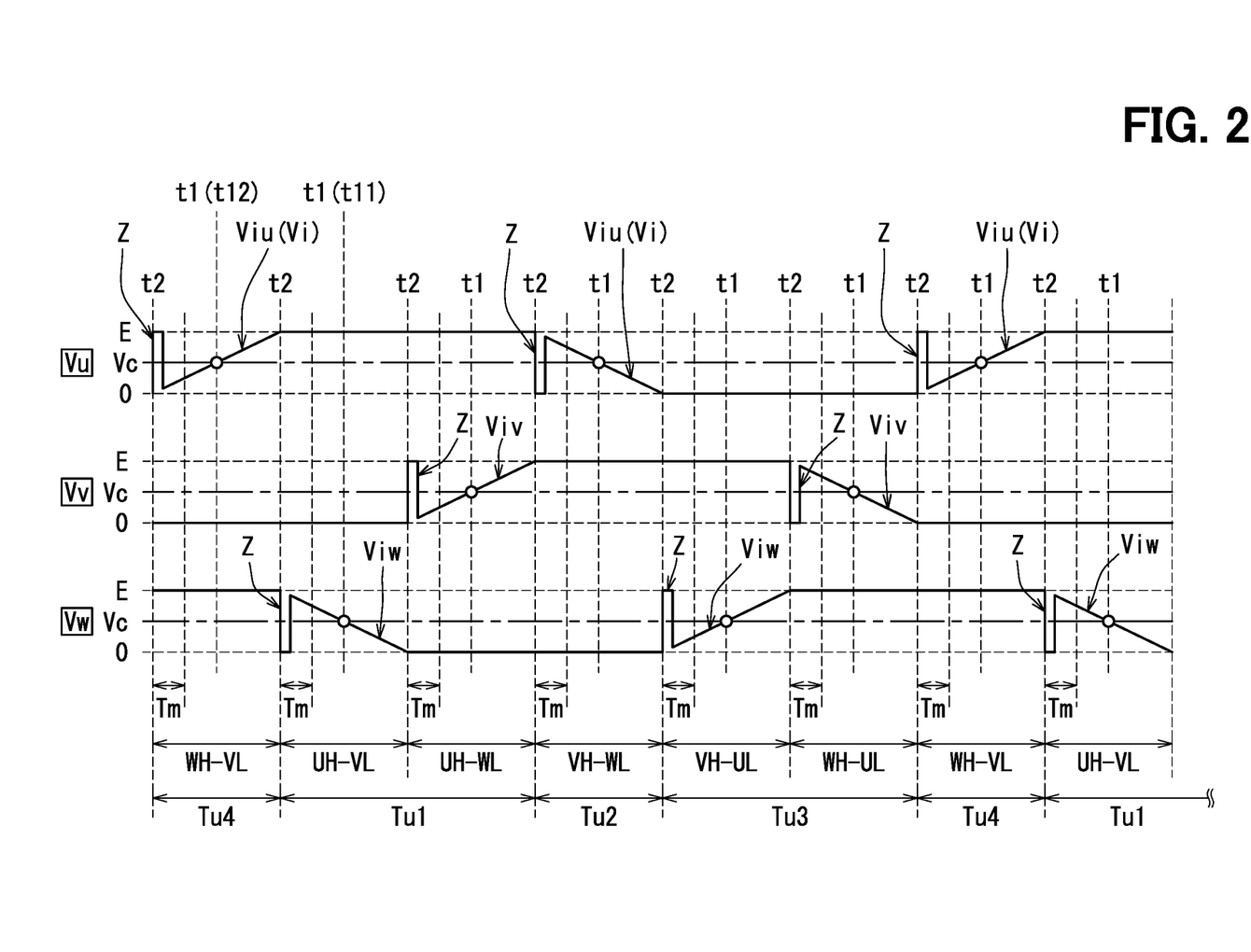
FIG. 2 is a timing diagram showing a relationship between a voltage displacement of each phase and a mask period in the first embodiment.

A horizontal axis of FIG. 2 indicates an elapsed time. A vertical axis of FIG. 2 shows a magnitude of the voltage of the U-phase terminal 5u (i.e., U-phase voltage Vu), the voltage of the V-phase terminal 5v (i.e., V-phase voltage Vv), and the voltage of the W-phase terminal 5w (i.e., W-phase voltage Vw). A vertical axis shown at the bottom row of FIG. 2 indicates a count value used for setting a mask period Tm, which is described later.

As shown in FIG. 2, the U-phase terminal 5u is in a "voltage E fixed state" fixed to the power supply voltage E during a period Tu1 in which the switch 21u is conducted and the switch 22u is interrupted. The U-phase terminal 5u is in a "zero voltage constrained state" fixed at a zero voltage (i.e., substantially at the ground potential, also known as a "grounded state") during a period Tu3 in which the switch 21u is interrupted and the switch 22u is conducted. The U-phase terminal 5u goes into a "high impedance state" during periods Tu2 and Tu4 in which both of the switches 21u and 22u are interrupted.

In the present embodiment, since each of the switch 21u to 22w is duty-controlled, if the duty is 100%, the voltage of the power terminal in the voltage E fixed state is a voltage as shown in the period Tu1 of FIG. 2, i.e., the voltage becomes stuck to E. On the other hand, if the duty is less than 100%, the voltage becomes zero during a duty off period even when it is in the voltage E fixed state.

Further, as shown in FIG. 2, a U-phase induced voltage Viu is induced at the U-phase terminal 5u in the high impedance state. The U-phase induced voltage Viu is generated by an interlinking of a magnetic flux from a magnetic pole pair of the rotor with the windings L1 and L3 that are connected to the U-phase terminal 5u. Therefore, the U-phase induced voltage Viu changes according to a relative rotation position between (a) the windings L1 and L3 and (b) the rotor. Further, in the following description, when the U-phase induced voltage Viu, a V-phase induced voltage Viv, and a W-phase induced voltage Viw are not particularly distinguished from each other (i.e., they behave similarly), they may simply be described as an induced voltage Vi.

The comparator circuits 50u, 50v, and 50w detect the induced voltage Vi induced in a winding whose phase is different from the energized phase among the multiple phase windings L1, L2, and L3. Further, the comparator circuits 50u, 50v, and 50w compare the detected induced voltage Vi and a reference voltage Vc in magnitude, and output a comparison result to the control unit 30. The reference voltage Vc is set to a value smaller than the power supply voltage E or to, for example, a half of the power supply voltage E.

For example, the comparator circuit 50u outputs a high-level signal when the U-phase voltage Vu is greater than the reference voltage Vc, and outputs a low-level signal when the U-phase voltage Vu is smaller than the reference voltage Vc. The timing at which the signal output from the comparator circuit 50u is switched from the high level to the low level and the timing at which the signal is switched from the low level to the high level are called "passage timings (or zero cross timings)." The comparator circuits 50u, 50v, and 50w that detect such passage timings may be called a "passage timing detector."

The control unit 30 acquires the passage timing at which the induced voltage Vi has passed the reference voltage Vc by acquiring comparison result signals from the comparator circuits 50u, 50v, and 50w. The passage timing is a so-called zero cross timing, and corresponds to a position detection timing t1 in FIG. 2. The position detection timing t1 has a correlation with the rotation position of the rotor. Therefore, the control unit 30 sets a switching timing t2 for switching the energized phase of the power terminal based on the acquired position detection timing t1.

As shown in FIG. 2, the number of the position detection timings t1 detected within 360 degrees of the electric angle is six in total, that is, during the periods Tu1 to Tu4 (specifically, during the four periods in sequence: Tu1, Tu2, Tu3, and Tu4), and, more specifically 2 for each phase. That is, the position detection timing t1 is acquired by the control unit 30 at intervals of 60 degrees of the electric angle. The control unit 30 controls the zero cross caused by the PWM control so as not to be reflected to the switching timing t2 as the position detection timing t1.

More specifically, the control unit 30 sets the time interval of the immediately preceding two passage timings as a cycle period corresponding to an electric angle of 60 degrees. For example, a time interval of the position detection timing t1 shown by symbols t11 and t12 in FIG. 2 corresponds to the cycle period. The control unit 30 sets half the length of the cycle period as a switching period, and sets a time point at which the switching period has elapsed from the position detection timing t1 as a switching timing t2. When an advance angle is set, the control unit 30 sets the switching period to have a shorter length of time by an amount of the electric angle corresponding to the advance angle.

The control unit 30 controls the operation of the upper and lower arm circuits 20$u$, 20$v$, and 20$w$ so as to switch the energized phase at each switching timing t2. In such manner, at the power terminals of each phase, the voltage E fixed state of 120 degrees (period Tu1), the high impedance state of 60 degrees (period Tu2), the zero voltage fixed state of 120 degrees (period Tu3), and the high impedance state of 60 degrees (period Tu4) are repeated. In other words, the motor 5 is driven by the motor controller 6 in a substantially trapezoidal wave drive. Further, the power terminals are controlled to be displaced from each other by (i.e., to have a displace angle of) 120 degrees of the electric angle between the adjacent phases.

As shown in FIG. 2, the waveform of a counter electromotive voltage Z is superimposed on a portion immediately after the switching timing t2 in the voltage waveform of the power terminal. Such a counter electromotive voltage Z is a voltage generated by the self-induction of the windings L1, L2, and L3 when the energized phase is switched. The control unit 30 sets the mask period Tm in order to prevent the position detection timing t1 from being falsely/falsely detected due to the counter electromotive voltage Z. In the mask period Tm, the control unit 30 prohibits a reflection of the detected position detection timing t1 in or to the switching control. Also, in the mask period Tm, the comparator circuits 50$u$, 50$v$, and 50$w$ respectively prohibit the output of the detection signal.

The control unit 30 sets the mask period Tm based on the time interval of the immediately preceding two passage timings. For example, a length of half or less of the above-mentioned cycle period is set as the mask period Tm. Further, a start timing of the mask period Tm is set to the switching timing t2. The control unit 30 corrects the length of the mask period Tm based on the current value detected by the current sensor 60. More specifically, the greater the detected current value, the longer the counter electromotive voltage period Tz becomes, thereby the mask period Tm is corrected to have a longer length of time. Further, the control unit 30 repeatedly sets the mask period Tm every time the energized phase switching control is performed. That is, the control unit 30 repeatedly updates the mask period Tm for each cycle period.

The current sensor 60 detects the magnitude of the electric current flowing through the motor 5. More specifically, the magnitude of the electric current flowing into the ground terminal 13, that is, the magnitude of the electric current flowing through the power terminal is detected. Note that the power terminal has/receives (i) an electric current flowing through one winding that corresponds to the energized phase and (ii) an electric current flowing through two windings connected in series corresponding to the non-energized phase. The total value of these electric currents is detected by the current sensor 60.

The control unit 30 has a processor (i.e., CPU 31) as an arithmetic processing device and a memory 32 as a storage device. The CPU 31 and the memory 32 may also be called as a microcomputer/microcontroller. The memory 32 is a non-transitory, substantial storage medium that non-temporarily stores "programs and/or data" that is readable by the CPU 31. The control unit 30 may be realized by/implemented as a dedicated hardware logic circuit, or may be realized by/implemented as a combination of (i) a processor that executes a computer program and (ii) a hardware logic circuit.

Meanwhile, immediately after switching the energized phase, the counter electromotive voltage Z (also known as a flyback voltage or a reflux voltage) is generated as described above. Hereinafter, a reflux current generated by the counter electromotive voltage Z is described.

Figure 3:
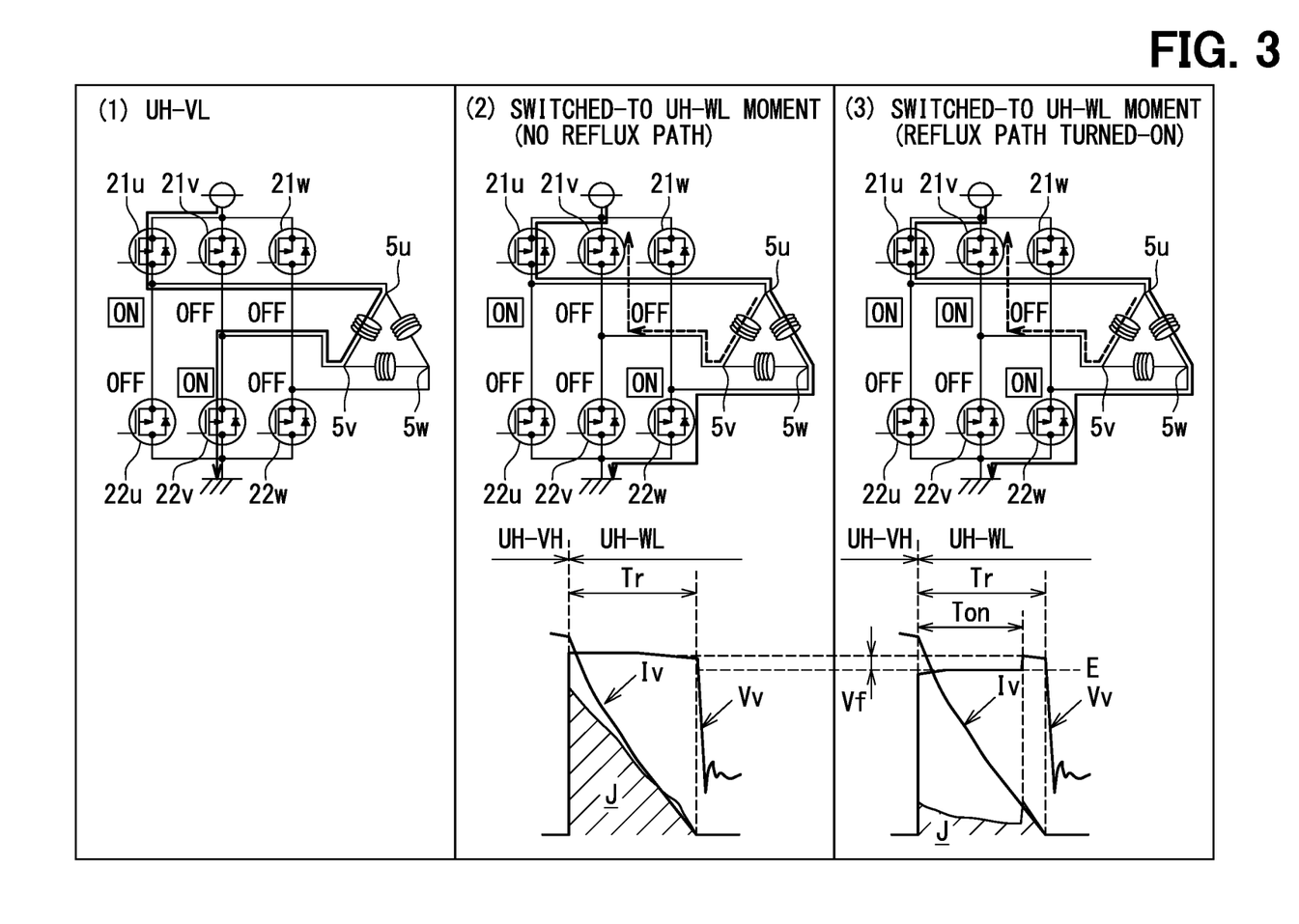
FIG. 3 is a diagram illustrating effects of reflux-on control according to the first embodiment.

For example, when the switch 21$u$ related to the U phase is turned on for the upper arm and the switch 22$v$ related to the V phase is turned on for the lower arm, an electric current flows as shown by an arrow in FIG. 3 (1). That is, an electric current flows from the U-phase terminal 5$u$ to the V-phase terminal 5$v$. In the following description, such a switch-on combination is referred to as UH-VL.

After that, when switching to UH-WL as shown in FIG. 3 (2), the electric current flowing through the switch 22$v$ until just before then flows through the parasitic diode of the switch 21$v$ (see a broken line arrow in FIG. 3 (2)). The electric current flowing in such manner is a reflux current. In other words, when the voltage of the V-phase terminal 5$v$ (i.e., V-phase voltage Vv) becomes greater than the power supply voltage E due to the counter electromotive voltage Z generated immediately after the switching of the energized phase, a reflux current flows through the parasitic diode of the switch 21$v$. In an example of FIG. 3, the V-phase voltage Vv is greater than the power supply voltage E by an amount indicated by a reference sign Vf.

The lower part of FIG. 3 (2) shows the time change of (i) the electric current (i.e., V-phase current Iv) flowing through the V-phase terminal 5$v$ and (ii) the V-phase voltage Vv. The area shown as a shaded area in FIG. 3 (2) indicates the magnitude of the power consumed by the switch 21$v$ (i.e., power consumption J) with the V-phase current Iv and the V-phase voltage Vv. More descriptively, J is a power consumed over a period of time, and thus is an energy lost to heat. As shown in the drawing, the period in which the counter electromotive voltage Z is generated in the V-phase voltage Vv waveform corresponds to a period during which the reflux current flows (i.e., reflux period Tr). As shown by a waveform of the V-phase current Iv in the reflux period Tr, the reflux current decreases with the passage of time.

As shown in FIG. 3 (2), when a reflux current flows through the switch 21$v$ in an OFF state, the electrical resistance of the switch 21$v$ is greater than the same in the ON state. Therefore, there is a concern that the switch 21$v$ may deteriorate due to heat generation by such reflux current, together with an increase of the power consumption J.

In view of such aspect, the control unit 30 turns on the switch 21$v$ as shown in FIG. 3 (3) so that the reflux current flows through the switch 21$v$ in the on state. The ON-time of the switch for passing (i.e., resistance-free flow of) the reflux current in such manner is called a reflux-ON period Ton. In an example shown in the lower part of FIG. 3 (3), the reflux-ON period Ton is set to have a length shorter than the reflux period Tr. Further, the start timing of the reflux-on period Ton is set to be the same as the start timing of the reflux period Tr.

In the reflux-on period Ton, the V-phase voltage Vv drops to almost the same magnitude as the power supply voltage E due to the decrease in the electrical resistance of the switch 21$v$. In the reflux period Tr after the reflux-on period Ton, the V-phase voltage Vv temporarily rises due to the increase in the electrical resistance of the switch 21$v$, and the power consumption J increases at the same time.

In order to suppress the increase in the power consumption J generated in the reflux period Tr after the reflux-on period Ton, the length of the reflux-on period Ton may be set to be equal to the reflux period Tr or more. However, if the reflux-on period Ton is set to have a longer length than the mask period Tm, zero cross occurs with the reflux on at the end timing of the mask period Tm. As a result, the position detection timing t1 is "falsely" detected (i.e., undesirably detected) at an early timing, and there may be a concern that the switching timing t2 is thus falsely/undesirably/prematurely set at an early timing.

Such a concern is more specifically described with reference to FIG. 4.

Figure 4:
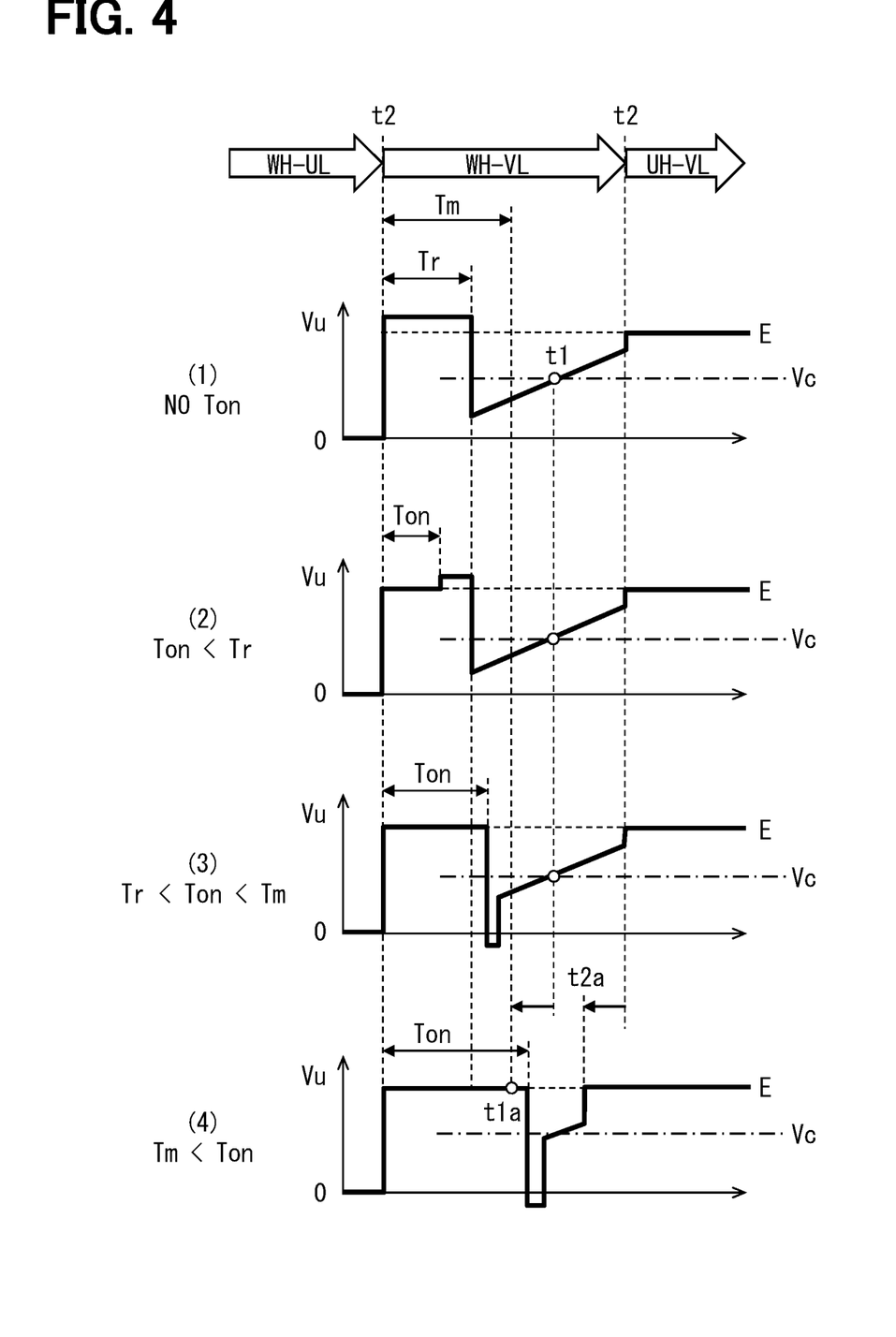
FIG. 4 is a timing diagram showing a relationship between the mask period, a reflux time, and a reflux on period when a length of the reflux on period is changed according to the first embodiment.

In an example of FIG. 4, the change in the U-phase voltage Vu when the energized phase is sequentially switched from WH-UL to WH-VL and UH-VL at two consecutive switching timings t2 is shown. In FIG. 4 (1), as described above, the switch-on control (i.e., reflux-ON control) for passing the reflux current is not performed. In FIG. 4 (2), the reflux-on period Ton is set shorter than the reflux period Tr. In FIG. 4 (3), the reflux-on period Ton is set to be longer than the reflux period Tr and shorter than the mask period Tm. It should be noted that the mask period Tm is set longer than the reflux period Tr, as described above. In FIG. 4 (4), the reflux-on period Ton is set longer than the mask period Tm.

In the cases of FIGS. 4 (1), (2) and (3), the position detection timing t1 is correctly detected, and, accordingly, the switching timing t2 is also set correctly. On the other hand, in the case of FIG. 4 (4), at timing t1a at which the mask period Tm ends, zero cross occurs at the timing of the reflux on. In such manner, the timing t1a is falsely detected as a timing earlier than the original position detection timing t1. In such manner, the energized phase is switched at a timing t2a earlier than the original switching timing t2 based on the falsely detected timing t1a.

In the cases of FIGS. 3 (2) and 3 (3), the reflux-ON control can be performed without causing the above-mentioned false detection, and the power consumption J and the heat generation can both be reduced as compared with the case of FIG. 3 (1). Further, in the case of FIG. 3 (3), since the period in which the reflux current flows without the "reflux ON" is eliminated, the power consumption J and the heat generation can both be reduced as compared with the case of FIG. 3 (2).

Figure 5:
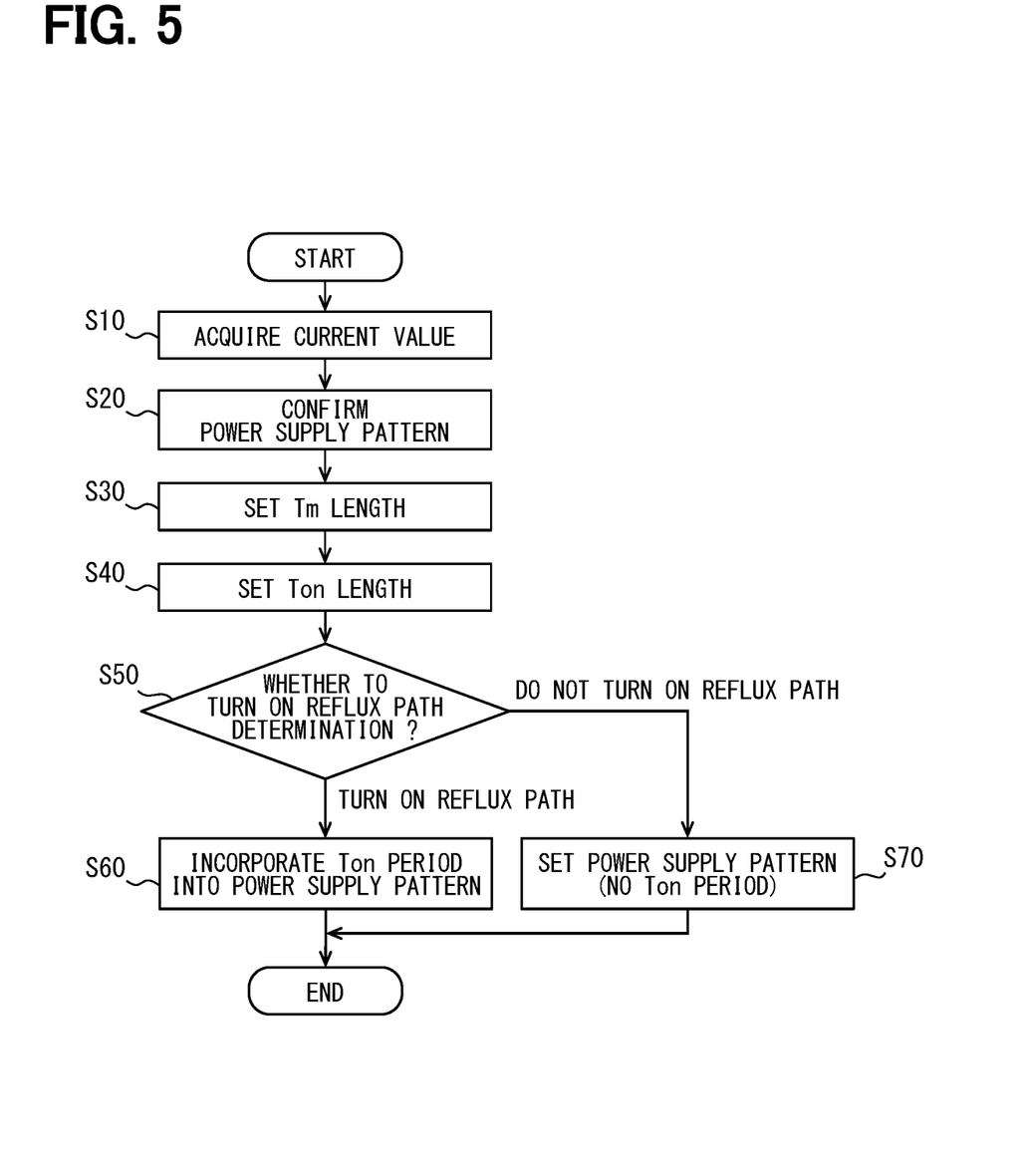
FIG. 5 is a flowchart showing a procedure of reflux-on control according to the first embodiment.

Next, the procedure of the process in which the control unit 30 performs the reflux-on control is described with reference to FIG. 5. The process of FIG. 5 is triggered by the detection of zero cross.

Figure 6:
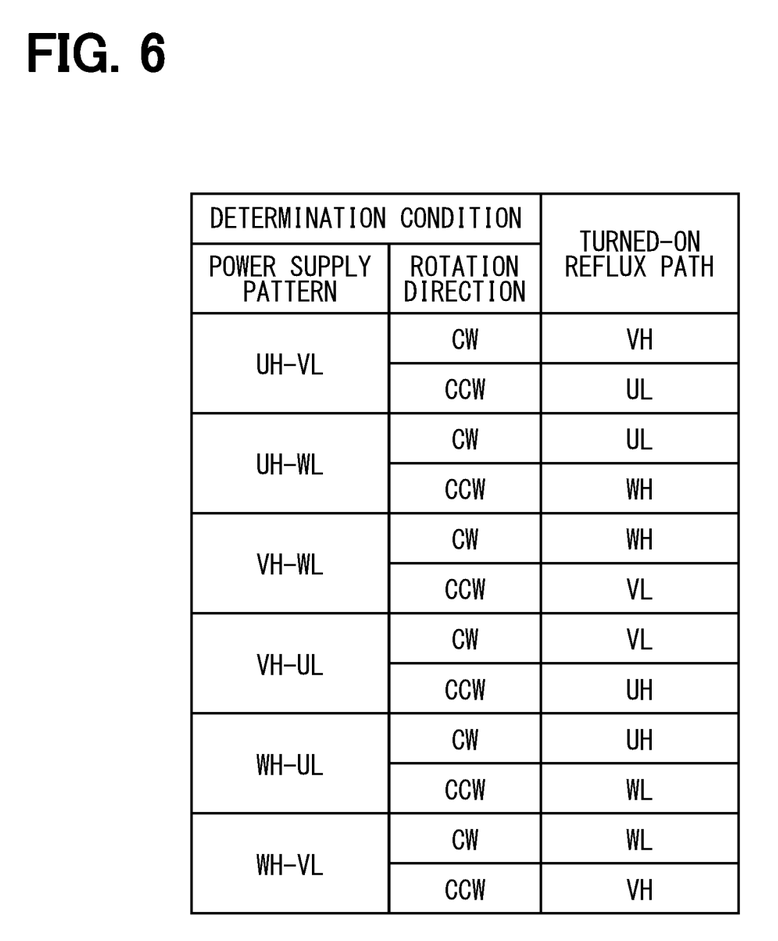
FIG. 6 is a diagram showing a relationship between an energized phase switch and a reflux switch in the first embodiment.

First, in step S10, the current value detected by the current sensor 60 is acquired. Subsequently in step S20, a power supply pattern and a rotation direction of the motor 5 at the time of zero cross detection are confirmed. Based on the confirmation results, a switch to be turned on for reflux is identified. For example, as shown in FIG. 6, a switch subject to the next reflux on control to be performed at the next switching timing t2 is identified from the power supply pattern and the rotation direction at the time of zero cross detection. A reference sign CW in FIG. 6 means forward/clockwise rotation, and a reference sign CCW means reverse/counter-clockwise rotation. FIGS. 2 to 4 show various changes in the case of forward rotation.

Subsequently in step S30, the length of the mask period Tm is set based on the current value acquired in step S10. In other words, since the length of the reflux period Tr changes according to the current value, the mask period Tm is variably set according to the current value so that the length includes (i.e., is longer than) the reflux period Tr that changes in such manner. For example, the length obtained by adding a predetermined time Ta to the reflux period Tr estimated according to the current value is set as the mask period Tm. In equation form: Tm=Tr+Ta. Generally, the greater the current value is, the longer the mask period Tm is set.

Subsequently in step S40, the length of the reflux-ON period Ton is set based on the set mask period Tm. For example, the length obtained by subtracting a predetermined time Tb from the mask period Tm set as described above is set as the reflux-ON period Ton. In equation form: Ton=Tm−Tb. In other words, a large current value causes a large reflux time Tr, which causes a large mask period Tm (because Tm=Tr+Ta), which causes a large reflux-ON period Ton (because Ton=Tm−Tb).

Thus, the greater the current value, the longer the reflux-on period Ton is set. The predetermined time Tb may be the same as the predetermined time Ta, may be longer than the predetermined time Ta, or may be shorter than that.

When setting the length of the reflux-on period Ton, the relationship between (i) the mask period Tm or the current value and (ii) the reflux-on period Ton is stored in the memory 32 in advance as a map or a calculation formula. Such a relationship is individually set according to the values of the electric resistance and/or the inductance of each phase of the motor 5. In other words, the above relationship is individually set according to the power supply pattern shown in FIG. 6, that is, according to the switch for flowing/passing the reflux current.

Subsequently in step S50, it is determined whether or not to perform the reflux-on control. More specifically, it is determined that the reflux-on control is performed when the reflux-on period Ton length set in step S40 is equal to or longer than a predetermined time Tc. The predetermined time Tc is set to the length of time required for switching the switches 21u to 22w ON or OFF. For example, the predetermined time Tc may be the same as the predetermined time Ta and Tb, and may be longer or shorter than those.

When it is determined that the reflux-ON control is performed, subsequently in step S60, the reflux-ON period Ton set in step S40 is incorporated into an energization time of the switch to be energized at the next switching timing t2. For example, if a zero cross is detected at the position detection timing t1 during a power supply pattern WH-UL, the switch 21u is set as a subject of the reflux-on control when switching the power supply pattern to a pattern WH-VL at the next switching timing t2. Then, the energization time of the switch 21u is set to the length of time that has incorporated the reflux-on period Ton.

Alternately, in step S70, if the reflux-on period Ton is less than the predetermined time Tc, then the energization time of the switch 21u is set without incorporating the reflux-on period Ton.

Hereinafter, the effects of the motor controller 6 by having the above-described configuration are described.

In the following description, among the plurality of switches 21u to 21w and 22u to 22w, a switch forming an energization path to the energized phase is referred to as an energized phase switch. A switch other than the energized phase switch is called a non-energized phase switch. For example, in a state of UH-WL shown in FIG. 3 (3), the switches 21u and 22w respectively correspond to the energized phase switch, and the switches 21v, 21w, 22u and 22v respectively correspond to the non-energized phase switch. Further, among a plurality of non-energized phase switches, a switch that forms a path of a reflux current generated by switching the energized phase is called a reflux switch. For example, in a state of UH-WL shown in FIG. 3 (3), the non-energized phase switch 21v corresponds to the reflux switch.

In the present embodiment, the control unit 30 controls the reflux switch in addition to the energized phase switch to an ON state. For example, in the case of FIG. 3 (3), in addition to the energized phase switches 21u and 22w, the non-energized phase switch 21v, which is a reflux switch, is controlled to be in an on state. In such manner, since the reflux current flows through the reflux switch in an on state, the reflux current flows with a lower electric resistance than the body diode. Thus, heat generated by the reflux switch can be reducible, and the deterioration of the reflux switch due to heat generation can be suppressed. In addition, the power consumption J due to the flow of the reflux current through the reflux switch can be reducible.

Further, the present embodiment includes a current sensor 60 that detects the magnitude of the electric current flowing through the energized phase. Further, the greater the detected value of the electric current is, the longer the on period for the turning on of the reflux switch is made by the control unit 30 (i.e., the control unit 30 extends the reflux-on period Ton to have a longer length). Therefore, when the reflux period Tr becomes longer as the electric current becomes large, the reflux-on period Ton is set as a longer period, so that the effect of reducing heat generation by the reflux-on control can be improved.

Here, when the reflux-on period Ton is sufficiently short, there may be a high risk that the reflux-on period Ton exceeds the mask period Tm, and, there may also be a concern about false detection of zero cross. In view of such concern, in the present embodiment, the control unit 30 controls the reflux switch to be in the ON state on condition that the reflux-on period Ton set according to the current value is equal to or greater than the predetermined time Tc. Therefore, the above-described concern can be alleviated. Further, when the reflux-on period Ton is less than the predetermined time Tc, even if the reflux-on control is prohibited and the reflux current passes through the reflux switch in an off state, heat generation is caused only for a short time, which makes it allowable.

Now, the reflux period Tr may differ depending on the values of the electric resistance and the inductance of each phase of the motor 5. Therefore, an optimum reflux-on period Ton may differ phase to phase. In view of such point, in the present embodiment, the on period for turning on the reflux switch, that is, the length of the reflux-on period Ton is set individually, i.e., differently, for each of the plurality of phases. That is, in other words, an optimum length of the reflux-on period Ton is calculated with high accuracy. The optimum length of the reflux-on period Ton may be a longest-possible length of time that does not exceed the mask period Tm (Ton=Tm, not shown in FIG. 4).

Further, in the present embodiment, the timing for ending an ON state of the reflux switch is set before the end of the mask period Tm. For example, in an example of FIG. 4 (3), the mask period Tm and the reflux-on period Ton start at the same time, and the reflux-on period Ton is set shorter than the mask period Tm. In such manner, the end timing of the reflux-on period Ton is set before the end of the mask period Tm. According to such setting, as described above with reference to FIG. 4 (4), false detection of the position detection timing t1 can be suppressed. Therefore, it is possible to diminish the concern that the switching timing t2 significantly deviates from an appropriate timing, which may cause out-of-synchronization motor control.

Further, in the present embodiment, the timing for ending an ON state of the reflux switch is set to a timing after the reflux current flow period. For example, in an example of FIG. 4 (3), the reflux period Tr and the reflux-on period Ton starts at the same time, and the reflux-on period Ton is set longer than the reflux period Tr. In such manner, the end timing of the reflux-on period Ton is set after the reflux period Tr. According to such setting, as compared with the case of FIG. 4 (2), the reflux current flow period caused by the on state of the reflux switch can be made longer. Therefore, the effect of reducing heat generation in the reflux switch can be promoted.

Here, the reflux current peaks (i.e., flows/runs maximum) at the start of the reflux period Tr. That is, the reflux current becomes maximum at the switching timing t2 of the energized phase. In view of such point, in the present embodiment, an on-start timing of the reflux switch is set at the same timing as the switching of the energized phase. Therefore, the effect of the reflux-on control is exhibited when the reflux current takes a peak value, thereby improving the effect of reducing heat generation in the reflux switch.

Other Embodiments

Although multiple embodiments of the present disclosure have been described above, not only the combinations of the configurations explicitly shown in the description of entirety of each embodiment, but also the configurations of multiple embodiments can be partially combined even if the combination is not explicitly shown unless otherwise indicated. It should be understood that the unexplained combinations of the structural components recited in the following embodiments and modifications thereof are assumed to be disclosed in this description by the following explanation.

In the first embodiment described above, when setting the reflux-ON period Ton according to the current value, the reflux-on control is performed on condition that the reflux-on period Ton is equal to or greater than a predetermined time Tc. On the other hand, the above condition may be abolished for performing the reflux-on control.

In the first embodiment, the reflux-on period Ton is set to a different value depending on the current value. On the other hand, the reflux-ON period Ton may be set to a fixed value regardless of the current value.

In the first embodiment, the length of the reflux-ON period Ton is set individually for each of the plurality of phases. That is, even if the current values are the same, the reflux-ON period Ton is set to a different length depending on which is the energized phase. On the other hand, regardless of which of the energized phases, the reflux-ON period Ton may be set to the same length when the current values are the same.

In the first embodiment, the timing for ending the ON state of the reflux switch is set after the period during which the reflux current flows. On the other hand, the timing for ending the ON state of the reflux switch may be set before the period during which the reflux current flows.

In the first embodiment, the on-start timing of the reflux switch is set to the same timing as the switching of the energized phase. On the other hand, the ON-start timing of the reflux switch may be immediately after the switching of the energized phase.

In the first embodiment, the energized phase switch is PWM controlled, but the energized phase switch may be controlled to be ON (i.e., may be turned ON) in the state of 100% duty, i.e., without PWM control. Further, in the first embodiment, the motor 5 is driven by a trapezoidal wave, but it may be driven by a rectangular wave.

In the first embodiment, the three windings L1, L2, and L3 are connected by a delta connection, but may be connected by a Y connection.

What is claimed is:

1. A motor controller for controlling a drive of a motor having multiple phase windings, the motor controller comprising:
   a plurality of upper and lower arm circuits formed by a plurality of switches; and
   a control unit switching on/off states of the plurality of switches to sequentially switch an energized phase among a plurality of phases, wherein,
   among the plurality of switches, a switch or switches that form an energization path to the energized phase is designated as an energized phase switch or switches, and a switch or switches other than the energized phase switch is designated as a non-energized phase switch or switches,
   among the plurality of non-energized phase switches, a switch or a switches forming a path of a reflux current generated by the switching of the energized phase is designated as a reflux switch or switches,
   the control unit controls the reflux switch or switches into an ON state in addition to controlling the energized phase switch or switches, and
   the motor controller further comprises a passage timing detector detecting a passage timing at which an induced voltage in a winding whose phase is different from the energized phase or phases has crossed a reference voltage by rising or falling, wherein
   the control unit controls a switching timing for switching the energized phase or phases based on the passage timing detected by the passage timing detector,
   the control unit prohibits a reflection of the passage timing to a switching control in a mask period set to be longer than a reflux period in which the reflux current is generated, and
   a timing for ending the ON state of the reflux switch or switches is set to a timing before an end of the mask period.

2. The motor controller of claim 1 further comprising:
   a current sensor detecting a magnitude of an electric current flowing through the energized phase, wherein
   an ON period for a turning ON of the reflux switch or switches is increased by the control unit when a detected value of the electric current is increased.

3. The motor controller of claim 2, wherein
   the control unit controls the reflux switch or switches to be in the ON state on condition that the ON period set according to the detected value is a predetermined time or more.

4. The motor controller of claim 1, wherein
   an ON period for a turning ON of the reflux switch or switches is set individually for each of the plurality of phases.

5. The motor controller of claim 1, wherein
   the timing for ending the ON state of the reflux switch or switches is set to a timing after the reflux period during which the reflux current flows.

6. The motor controller of claim 1, wherein
   an ON-start timing of the reflux switch or switches is set at a same timing as the switching of the energized phase or phases.

7. A motor controller comprising:
   a processor; and
   a non-transitory computer-readable storage medium including instructions,
   wherein the motor controller is configured to:
   acquire a motor current from a current sensor at a crossing of a phase voltage and reference voltage;
   determine a power supply pattern and a rotation direction of a motor;
   identify a reflux switch for a reflux current based on the power supply pattern and the rotation direction of the motor;
   set a mask period based on the motor current, such that the mask period>a reflux period;
   set a reflux-ON period, such that the reflux-ON period<the mask period;
   detect a passage timing at which an induced voltage in a winding of the motor whose phase is different from an energized phase or phases has crossed the reference voltage by rising or falling;
   control a switching timing for switching the energized phase or phases based on the passage timing; and
   prohibit a reflection of the passage timing to a switching control in the mask period set to be longer than the reflux period during which the reflux current flows, wherein
   a timing for ending the ON state of the reflux switch or switches is set to a timing before an end of the mask period.

8. The motor controller of claim 7, wherein the motor controller is further configured to:
   determine whether the reflux-ON period≥a predetermined time; and
   upon a determination that the reflux-ON period≥the predetermined time, turn ON a reflux path for the reflux-ON period.

9. The motor controller of claim 8, wherein:
   the reflux-ON period<the reflux period.

10. The motor controller of claim 8, wherein:
    the reflux period<the reflux-ON period<the mask period.

11. The motor controller of claim 8, wherein:
    the reflux-ON period=the reflux period.

12. The motor controller of claim 7, wherein the motor controller is further configured to:
    determine whether the reflux-ON period≥a predetermined time; and
    upon a determination that the reflux-ON period<a critical time period, drive the motor without turning ON a reflux switch.

13. The motor controller of claim 7 further comprises:
    a first comparator configured to compare a U-phase voltage and a reference voltage;
    a second comparator configured to compare a V-phase voltage and the reference voltage; and
    a third comparator configured to compare a W-phase voltage and the reference voltage,
    wherein the motor controller is further configured to determine cross timings of: the U-phase voltage and the reference voltage; the V-phase voltage and the reference voltage; and the W-phase voltage and the reference voltage.

* * * * *